(12) United States Patent
Pherson et al.

(10) Patent No.: US 11,851,270 B2
(45) Date of Patent: Dec. 26, 2023

(54) LATCH FOR AIR CARGO CONTAINER DOORS

(71) Applicant: Advanced Composite Structures, LLC, Charleston, SC (US)

(72) Inventors: Thomas Pherson, Daniel Island, SC (US); Wendell Douglas Gissel, Summerville, SC (US)

(73) Assignee: Advanced Composite Structures, LLC, Charleston, SC (US)

( * ) Notice: Subject to any disclaimer, the term of this patent is extended or adjusted under 35 U.S.C. 154(b) by 526 days.

(21) Appl. No.: 16/755,207

(22) PCT Filed: Oct. 9, 2018

(86) PCT No.: PCT/US2018/054905
§ 371 (c)(1),
(2) Date: Apr. 10, 2020

(87) PCT Pub. No.: WO2019/074864
PCT Pub. Date: Apr. 18, 2019

(65) Prior Publication Data
US 2020/0255215 A1 Aug. 13, 2020

Related U.S. Application Data

(60) Provisional application No. 62/570,201, filed on Oct. 10, 2017.

(51) Int. Cl.
*E05C 3/04* (2006.01)
*E05B 13/00* (2006.01)
(Continued)

(52) U.S. Cl.
CPC ............. *B65D 90/008* (2013.01); *B64D 9/00* (2013.01); *B65D 88/14* (2013.01); *B65D 90/021* (2013.01);
(Continued)

(58) Field of Classification Search
CPC ...... E05C 3/046; Y10T 292/57; Y10S 292/32; E05B 83/12; E05B 13/002;
(Continued)

(56) References Cited

U.S. PATENT DOCUMENTS 1,016,594 A * 2/1912 Woodman ................. B27F 5/02
269/152
1,161,085 A * 11/1915 Test et al. ................ E05B 83/02
292/DIG. 32
(Continued)

FOREIGN PATENT DOCUMENTS

CN 207585186 U 7/2018
DE 3004699 A1 8/1980
(Continued)

OTHER PUBLICATIONS

International Search Report for PCT/US18/54905 dated Feb. 7, 2019.
(Continued)

*Primary Examiner* — Christine M Mills
*Assistant Examiner* — Faria F Ahmad
(74) *Attorney, Agent, or Firm* — Womble Bond Dickinson (US) LLP

(57) ABSTRACT

A latch for securing a component to a track in a base of air cargo equipment, such as a pallet or the floor of a unit load device. The latch includes a rigid support configured to be attached at the bottom edge of the component. The latch also includes a handle. The handle rotates relative to the support between an open position and a closed position. The handle uses a rotationally tapered locking cam to secure the component to the track. In one embodiment, the component is a door, such as a fabric curtain.

18 Claims, 9 Drawing Sheets

(51) Int. Cl.
| | |
|---|---|
| E05B 83/02 | (2014.01) |
| E05B 67/38 | (2006.01) |
| E05B 65/00 | (2006.01) |
| E05B 83/12 | (2014.01) |
| B65D 90/00 | (2006.01) |
| B64D 9/00 | (2006.01) |
| B65D 88/14 | (2006.01) |
| B65D 90/02 | (2019.01) |

(52) U.S. Cl.
CPC ........ *E05C 3/046* (2013.01); *B65D 2590/666* (2013.01); *E05B 13/002* (2013.01); *E05B 65/0021* (2013.01); *E05B 67/383* (2013.01); *E05B 83/02* (2013.01); *E05B 83/12* (2013.01)

(58) Field of Classification Search
CPC .... E05B 65/0811; E05B 67/383; E05B 83/02; E05B 65/0021
See application file for complete search history.

(56) References Cited

U.S. PATENT DOCUMENTS

| | | | | |
|---|---|---|---|---|
| 1,557,382 | A | | 10/1925 | Sundback |
| 1,659,029 | A | * | 2/1928 | Julien ................ E05B 83/02 |
| | | | | 292/DIG. 32 |
| 1,672,507 | A | * | 6/1928 | Treptow ............. E05B 83/02 |
| | | | | 292/DIG. 32 |
| 1,806,772 | A | * | 5/1931 | Wasberg ........... E05C 19/005 |
| | | | | 292/259 R |
| 2,130,772 | A | * | 9/1938 | Mcbride ............. E05B 83/02 |
| | | | | 292/DIG. 32 |
| 2,495,636 | A | | 1/1950 | Hoeltzel et al. |
| 3,160,307 | A | | 12/1964 | Morrison |
| 3,161,258 | A | | 12/1964 | Chapman |
| 3,165,760 | A | | 1/1965 | Aram |
| 3,251,399 | A | | 5/1966 | Grossman |
| 3,347,580 | A | * | 10/1967 | Whiting ............. E05B 65/0811 |
| | | | | 292/242 |
| 3,372,729 | A | | 3/1968 | Lindenmayer |
| 3,556,448 | A | | 1/1971 | Dobbs |
| 3,558,423 | A | | 1/1971 | Rossetti, Jr. |
| 3,586,013 | A | | 6/1971 | Gladden |
| 3,591,034 | A | | 7/1971 | Lohr |
| 3,616,838 | A | | 11/1971 | Barr |
| 3,642,314 | A | * | 2/1972 | Smith ................ E05B 65/0811 |
| | | | | 292/134 |
| 3,657,042 | A | | 4/1972 | Rerolle |
| 3,671,542 | A | | 6/1972 | Kwolek |
| 3,709,552 | A | | 1/1973 | Broadbent |
| 3,723,234 | A | | 3/1973 | MacDonald |
| 3,740,978 | A | * | 6/1973 | Smith ................ E05B 13/002 |
| | | | | 292/108 |
| 3,785,694 | A | | 1/1974 | Sargent |
| 3,856,072 | A | | 12/1974 | Sund |
| 3,893,722 | A | * | 7/1975 | Galbreath .......... E05B 13/002 |
| | | | | 70/211 |
| 3,951,284 | A | | 4/1976 | Fell |
| 4,014,572 | A | * | 3/1977 | Binns ................ E05B 65/0811 |
| | | | | 292/108 |
| 4,046,186 | A | | 9/1977 | Nordstrom |
| 4,131,150 | A | | 12/1978 | Papadakis |
| 4,137,394 | A | | 1/1979 | Meihuizen |
| 4,212,406 | A | | 7/1980 | Mittelmann |
| 4,221,256 | A | | 9/1980 | Karaki |
| 4,284,119 | A | | 8/1981 | Martin |
| 4,304,824 | A | | 12/1981 | Karpinski |
| 4,335,774 | A | | 6/1982 | Price |
| 4,356,138 | A | | 10/1982 | Kavesh |
| 4,389,862 | A | * | 6/1983 | Hastings ............ E05C 19/186 |
| | | | | 292/205 |
| 4,391,865 | A | | 7/1983 | Constance |
| 4,406,318 | A | | 9/1983 | Cukierski |
| 4,413,110 | A | | 11/1983 | Kavesh |
| 4,424,253 | A | | 1/1984 | Anderson |
| 4,429,730 | A | | 2/1984 | Elston |
| 4,440,711 | A | | 4/1984 | Kwon |
| 4,457,985 | A | | 7/1984 | Harpell |
| 4,493,870 | A | | 1/1985 | Vrouenraets |
| 4,535,027 | A | | 8/1985 | Kobashi |
| 4,538,663 | A | | 9/1985 | Looker |
| 4,545,611 | A | | 10/1985 | Broadbent |
| 4,557,961 | A | | 12/1985 | Gorges |
| 4,589,640 | A | | 5/1986 | Pert |
| 4,597,818 | A | | 7/1986 | Aoyama |
| 4,599,267 | A | | 7/1986 | Kwon |
| 4,600,235 | A | | 7/1986 | Frederick |
| 4,601,405 | A | | 7/1986 | Riemer |
| 4,738,371 | A | | 4/1988 | Wakeman |
| 4,780,351 | A | | 10/1988 | Czempoyesh |
| 4,795,047 | A | | 1/1989 | Dunwoodie |
| 4,802,233 | A | | 1/1989 | Skamser |
| 4,852,316 | A | | 8/1989 | Webb |
| 4,863,779 | A | | 9/1989 | Daponte |
| 4,874,648 | A | | 10/1989 | Hill |
| 4,876,774 | A | | 10/1989 | Kavesh |
| 4,894,281 | A | | 1/1990 | Yagi |
| 4,895,007 | A | * | 1/1990 | Eberly ................ E05B 67/38 |
| | | | | 292/205 |
| 4,895,878 | A | | 1/1990 | Jourquin |
| 4,898,008 | A | * | 2/1990 | Eberly ................ E05B 67/38 |
| | | | | 70/56 |
| 4,911,317 | A | | 3/1990 | Schloesser |
| 4,957,804 | A | | 9/1990 | Hendrix |
| 4,983,433 | A | | 1/1991 | Shirasaki |
| 4,983,449 | A | | 1/1991 | Nee |
| 4,991,640 | A | | 2/1991 | Verkindt |
| 5,063,764 | A | * | 11/1991 | Amis ................ E05B 83/04 |
| | | | | 70/285 |
| 5,082,721 | A | | 1/1992 | Smith, Jr. |
| 5,105,970 | A | | 4/1992 | Malone |
| 5,143,245 | A | | 9/1992 | Malone |
| 5,160,472 | A | | 11/1992 | Zachariades |
| 5,160,767 | A | | 11/1992 | Genske |
| 5,169,697 | A | | 12/1992 | Langley |
| 5,183,176 | A | | 2/1993 | Meier |
| 5,248,364 | A | | 9/1993 | Liu |
| 5,261,536 | A | | 11/1993 | Wilson |
| 5,266,390 | A | | 11/1993 | Garland |
| 5,284,036 | A | * | 2/1994 | Rosenbaum .......... E05C 19/186 |
| | | | | 70/56 |
| 5,284,540 | A | | 2/1994 | Roth |
| 5,286,576 | A | | 2/1994 | Srail |
| 5,360,129 | A | | 11/1994 | Lee |
| 5,377,856 | A | | 1/1995 | Brierton |
| 5,389,448 | A | | 2/1995 | Schirmer |
| 5,395,682 | A | | 3/1995 | Holland et al. |
| 5,398,831 | A | | 3/1995 | Avramides |
| 5,401,344 | A | | 3/1995 | Dickson |
| RE34,892 | E | | 4/1995 | Dunwoodie |
| 5,419,165 | A | * | 5/1995 | Perkins ................ E05B 67/383 |
| | | | | 292/288 |
| 5,431,284 | A | | 7/1995 | Wilson |
| 5,443,874 | A | | 8/1995 | Tachi |
| 5,445,883 | A | | 8/1995 | Kobayashi et al. |
| 5,454,471 | A | | 10/1995 | Norvell |
| 5,460,884 | A | | 10/1995 | Kobylivker |
| 5,472,760 | A | | 12/1995 | Norvell |
| 5,480,706 | A | | 1/1996 | Li |
| 5,490,567 | A | | 2/1996 | Speer |
| 5,500,305 | A | | 3/1996 | Bridges et al. |
| 5,529,363 | A | | 6/1996 | Borowski, Jr. |
| 5,547,536 | A | | 8/1996 | Park |
| 5,567,498 | A | | 10/1996 | McCarter |
| 5,570,801 | A | | 11/1996 | Younger |
| 5,578,373 | A | | 11/1996 | Kobayashi |
| 5,601,201 | A | | 2/1997 | Looker |
| 5,601,897 | A | | 2/1997 | Vermilion et al. |
| 5,652,041 | A | | 7/1997 | Buerger |
| 5,658,037 | A | | 8/1997 | Evans |
| 5,667,002 | A | | 9/1997 | Neustadt |
| 5,677,029 | A | | 10/1997 | Prevorsek |
| 5,702,657 | A | | 12/1997 | Yoshida |

(56) References Cited

U.S. PATENT DOCUMENTS

| | | |
|---|---|---|
| 5,761,854 A | 6/1998 | Johnson |
| 5,789,327 A | 8/1998 | Rousseau |
| 5,819,474 A | 10/1998 | Strom |
| 5,851,668 A | 12/1998 | Sandor |
| 5,867,002 A | 2/1999 | Dauvergne |
| 5,888,610 A | 3/1999 | Fournier |
| 5,915,445 A | 6/1999 | Rauenbusch |
| 5,927,025 A | 7/1999 | Brockman |
| 5,958,805 A | 9/1999 | Quinones |
| 5,976,998 A | 11/1999 | Sandor |
| 5,979,684 A | 11/1999 | Ohnishi |
| 6,027,106 A | 2/2000 | Ray |
| 6,054,205 A | 4/2000 | Newman |
| 6,080,474 A | 6/2000 | Oakley |
| 6,103,372 A | 8/2000 | Sandor |
| 6,113,031 A | 9/2000 | Williams |
| 6,156,682 A | 12/2000 | Fletemier |
| 6,161,714 A | 12/2000 | Matsuura |
| 6,164,030 A | 12/2000 | Dietrich |
| 6,237,793 B1 | 5/2001 | Fingerhut |
| 6,280,546 B1 | 8/2001 | Holland |
| 6,291,049 B1 | 9/2001 | Kunkel et al. |
| 6,322,873 B1 | 11/2001 | Orologio |
| 6,358,591 B1 | 3/2002 | Smith |
| 6,435,101 B1 | 8/2002 | Marker |
| 6,446,751 B1 | 9/2002 | Ahuja |
| 6,503,856 B1 | 1/2003 | Broadway et al. |
| 6,511,730 B1 | 1/2003 | Blair |
| 6,513,703 B2 | 2/2003 | Becker |
| 6,701,948 B2 | 3/2004 | Jopp |
| 6,711,872 B2 | 3/2004 | Anderson |
| 6,749,076 B2 | 6/2004 | Fingerhut |
| 6,755,232 B1 | 6/2004 | Holland et al. |
| 6,758,057 B2 | 7/2004 | Vince, II et al. |
| 6,787,228 B2 | 9/2004 | Campbell |
| 6,796,603 B2 * | 9/2004 | Pringnitz ............. B62D 33/037 |
| | | 292/241 |
| 6,800,367 B2 | 10/2004 | Hanyon |
| 6,802,551 B2 | 10/2004 | Nelson |
| 6,818,091 B1 | 11/2004 | Holland |
| 6,825,137 B2 | 11/2004 | Fu |
| 6,918,501 B2 | 7/2005 | Wang |
| 6,926,188 B2 | 8/2005 | Hazeyama |
| 6,928,843 B1 * | 8/2005 | Pirnie ..................... E05B 67/38 |
| | | 292/284 |
| 6,962,188 B2 | 11/2005 | Coenraets |
| 6,992,027 B1 | 1/2006 | Buckingham |
| 7,001,857 B2 | 2/2006 | Degroote |
| 7,017,954 B2 * | 3/2006 | Eklund ................... E06B 3/485 |
| | | 292/108 |
| 7,066,500 B2 * | 6/2006 | Haber ................. E05B 17/2038 |
| | | 292/216 |
| 7,087,300 B2 | 8/2006 | Hanyon |
| 7,111,661 B2 | 9/2006 | Laugenbach |
| 7,112,299 B2 | 9/2006 | Merrick |
| 7,114,756 B2 | 10/2006 | Nelson |
| 7,195,025 B2 | 3/2007 | Choi |
| 7,210,492 B2 | 5/2007 | Gerrie |
| 7,264,878 B2 | 9/2007 | Miller |
| 7,311,216 B2 | 12/2007 | Donnelly et al. |
| 7,622,406 B2 | 11/2009 | Holland et al. |
| D617,522 S | 6/2010 | Teien |
| 7,748,172 B2 | 7/2010 | Zupancich et al. |
| 7,785,693 B2 | 8/2010 | Johnson |
| 7,805,897 B2 | 10/2010 | Holland |
| 7,820,570 B2 | 10/2010 | Holland et al. |
| 7,828,029 B2 | 11/2010 | Holland et al. |
| 7,846,528 B2 | 12/2010 | Johnson |
| D630,815 S | 1/2011 | Teien |
| 7,901,537 B2 | 3/2011 | Jones |
| 7,913,511 B2 | 3/2011 | Meyer |
| 7,972,698 B2 | 7/2011 | Miller |
| 8,002,919 B2 | 8/2011 | Johnson |
| 8,004,393 B2 * | 8/2011 | Haber ................. G07C 9/00174 |
| | | 340/426.28 |
| 8,322,955 B2 | 12/2012 | Amesen |
| 8,342,588 B2 | 1/2013 | Skaradzinski |
| 8,479,801 B2 | 7/2013 | Holland et al. |
| 8,784,605 B2 | 7/2014 | Fingerhut |
| 8,839,842 B2 | 9/2014 | Ashelin |
| 8,938,998 B2 * | 1/2015 | Haber .................... E05C 3/045 |
| | | 70/276 |
| 8,973,769 B2 | 3/2015 | Huber |
| 9,051,014 B2 | 6/2015 | Lookebill |
| 9,090,392 B2 | 7/2015 | Loeschen |
| D740,555 S | 10/2015 | Huber |
| D740,556 S | 10/2015 | Huber |
| 9,174,796 B2 | 11/2015 | Pherson et al. |
| 9,174,797 B2 | 11/2015 | Pherson et al. |
| 9,248,958 B2 | 2/2016 | Pherson |
| 9,296,555 B2 | 3/2016 | Kawka |
| 9,827,529 B2 | 11/2017 | Rebouillat |
| 9,834,374 B2 | 12/2017 | Pherson |
| 9,930,997 B2 | 4/2018 | Larpenteur |
| 10,894,661 B2 * | 1/2021 | Pherson ................ B65D 90/021 |
| 11,084,652 B2 | 8/2021 | Pherson et al. |
| 2001/0001466 A1 | 5/2001 | Fingerhut |
| 2003/0098250 A1 | 5/2003 | Sabounjian |
| 2003/0106414 A1 | 6/2003 | Wang |
| 2004/0017789 A1 | 1/2004 | Hoynck |
| 2004/0045847 A1 | 3/2004 | Fairbank |
| 2004/0058119 A1 | 3/2004 | Wynne |
| 2004/0058603 A1 | 3/2004 | Hayes |
| 2004/0092379 A1 | 5/2004 | Lewis |
| 2004/0105994 A1 | 6/2004 | Lu |
| 2004/0140676 A1 * | 7/2004 | Eklund ................... E06B 3/485 |
| | | 292/97 |
| 2004/0155470 A1 * | 8/2004 | Senn .................. E05B 17/0025 |
| | | 292/285 |
| 2004/0226309 A1 | 11/2004 | Broussard |
| 2005/0074593 A1 | 4/2005 | Day |
| 2005/0109382 A1 | 5/2005 | Choi |
| 2005/0142971 A1 | 6/2005 | Chen |
| 2005/0211839 A1 | 9/2005 | Movsesian |
| 2006/0035555 A1 | 2/2006 | Narayanan |
| 2006/0138911 A1 | 6/2006 | Ransom |
| 2006/0189236 A1 | 8/2006 | Davis |
| 2006/0239791 A1 | 10/2006 | Morris |
| 2007/0289682 A1 | 12/2007 | Young |
| 2008/0003075 A1 | 1/2008 | Mapitigama |
| 2008/0070024 A1 | 3/2008 | Curran |
| 2008/0102721 A1 | 5/2008 | Holland et al. |
| 2008/0110580 A1 | 5/2008 | Hoerner |
| 2008/0145592 A1 | 6/2008 | Johnson |
| 2008/0197649 A1 | 8/2008 | Byler |
| 2008/0302049 A1 | 12/2008 | Stoneburner |
| 2008/0311336 A1 | 12/2008 | Dolgopolsky |
| 2008/0313980 A1 | 12/2008 | Holland |
| 2009/0004393 A1 | 1/2009 | Rodgers |
| 2009/0062432 A1 | 3/2009 | Doesburg |
| 2009/0140097 A1 | 6/2009 | Collier |
| 2009/0183808 A1 | 7/2009 | Sappington |
| 2009/0209155 A1 | 8/2009 | Goulet |
| 2009/0258180 A1 | 10/2009 | Goulet |
| 2009/0267354 A1 * | 10/2009 | Donaldson ............... E05B 53/00 |
| | | 296/202 |
| 2010/0122559 A1 * | 5/2010 | Chudzicki ............... E05C 3/045 |
| | | 70/91 |
| 2010/0132894 A1 | 6/2010 | Knutson |
| 2010/0209679 A1 | 8/2010 | Tompkins |
| 2010/0243807 A1 | 9/2010 | Hossain |
| 2010/0270318 A1 | 10/2010 | Dagher |
| 2011/0091713 A1 | 4/2011 | Miller |
| 2011/0136401 A1 | 6/2011 | Hanusa |
| 2011/0180959 A1 | 7/2011 | Donnelly |
| 2011/0274915 A1 | 11/2011 | Roberson |
| 2012/0018102 A1 | 1/2012 | Ungs |
| 2012/0111862 A1 | 5/2012 | Siegbert |
| 2012/0118881 A1 | 5/2012 | Holland |
| 2012/0118882 A1 | 5/2012 | Holland |
| 2012/0151851 A1 | 6/2012 | Cantin |
| 2012/0266561 A1 | 10/2012 | Piedmont |

(56) References Cited

U.S. PATENT DOCUMENTS

| | | |
|---|---|---|
| 2013/0032260 A1 | 2/2013 | Davies |
| 2013/0037393 A1 | 2/2013 | Howard |
| 2013/0161331 A1 | 6/2013 | Pherson |
| 2013/0340953 A1 | 12/2013 | Knutson |
| 2014/0008358 A1 | 1/2014 | Fingerhut et al. |
| 2014/0329429 A1 | 11/2014 | Eleazer |
| 2014/0335750 A1 | 11/2014 | Adams |
| 2015/0013275 A1 | 1/2015 | Davies |
| 2015/0053086 A1 | 2/2015 | Rebouillat |
| 2015/0246511 A1 | 9/2015 | Lookebill |
| 2015/0246749 A1 | 9/2015 | Huber |
| 2015/0267396 A1 | 9/2015 | Cantin |
| 2015/0343736 A1 | 12/2015 | Kawka |
| 2016/0039172 A1 | 2/2016 | Kawka |
| 2016/0046441 A1 | 2/2016 | Holland et al. |
| 2016/0107816 A1 | 4/2016 | Larpenteur et al. |
| 2016/0137408 A1 | 5/2016 | Pherson |
| 2016/0332417 A1 | 11/2016 | Kawka |
| 2017/0043687 A1 | 2/2017 | Preisler |
| 2017/0096295 A1 | 4/2017 | Pherson et al. |
| 2017/0108261 A1 | 4/2017 | Broussard |
| 2018/0290827 A1 | 10/2018 | Pherson |

FOREIGN PATENT DOCUMENTS

| | | | |
|---|---|---|---|
| DE | 4441842 A1 | 6/1995 | |
| EP | 0520745 A1 | 12/1992 | |
| EP | 2734458 A2 | 5/2014 | |
| GB | 995420 A | 6/1965 | |
| GB | 2051667 A | 1/1981 | |
| GB | 2349140 A | 10/2000 | |
| GB | 2501053 A | 10/2013 | |
| JP | S5388072 A | 8/1978 | |
| JP | H11210353 A | 8/1999 | |
| JP | 2004203395 A | 7/2004 | |
| WO | 2001074688 A1 | 10/2001 | |
| WO | 2005016643 A1 | 2/2005 | |
| WO | 2008054731 A2 | 5/2008 | |
| WO | 2010088811 A1 | 8/2010 | |
| WO | 2012085212 A2 | 6/2012 | |
| WO | 2013012782 A2 | 1/2013 | |
| WO | 2013106640 A1 | 7/2013 | |
| WO | 2015108422 A1 | 7/2015 | |
| WO | 2018142133 A1 | 8/2018 | |

OTHER PUBLICATIONS

English abstract of DE4441842, Nov. 3, 1997, 18 pgs.

English abstract of JP 11210353, last printed Dec. 31, 2015, 2 pgs.

English translation of the abstract of DE 3004699, last printed Oct. 17, 2011, 3 pgs.

Internet advertisement for Pitched-based Carbon Fiber/Composite, http://www.nsc.co.jp/nsmat/English/business_domain/bd09.html, last printed Jan. 31, 2012, 2 pgs.

Internet advertisement for Transonite Sandwich Panels, http://www.ebertcomposites.com/transonite.html, last printed Jan. 31, 2012, 2 pgs.

Internet advertisement for Vince Kelly's Carbon-Fiber Technology, http://www.goecities.com/capecanaveral/1320/, last printed Jan. 31, 2012, 16 pgs.

Internet Wikipedia encyclopedia on Carbon (fiber), http://en.wikipedia.org/wiki/Carbon_(fiber), last printed Jan. 31, 2012, 5 pgs.

Supreme Zipper Industries, Zipper Chain, 2010 copyright, last printed Dec. 31, 2015, 2 pgs.

Supreme Zipper Industries, Zipper Terminology Guide, 2010 copyright, last printed Dec. 31, 2015, 10 pgs.

Hammond et al. "Application of Vacuum Insulation Panel in the cold chain—Analysis of viability", London South Bank University, Jul. 28, 2014.

* cited by examiner

LATCH FOR AIR CARGO CONTAINER DOORS

FIELD OF THE DISCLOSURE

The present disclosure is related to cargo containers, for example air cargo containers. More specifically, the present disclosure relates to latches for securing a door or curtain of a cargo container in a closed position.

BACKGROUND

Air cargo containers have doors, often fabric doors, also referred to as curtains, which are designed to remain closed in the presence of internal forces that can be caused by the shifting of the container's contents. The minimum acceptable loads are specified in an SAE Standard AS36100 (2016).

The doors of cargo containers are often secured along their sides. In some instances, the doors may also be secured to the cargo container at one or more locations near or along the bottom of the door. The addition of attachment points near or along the bottom of the door can minimize door deflection. Securing the bottom of the door can also minimize the transfer of thermal energy (convection as the result of air flow) into and out of the container under the door. In addition, securing the bottom of the door can increase content security, typically by maintaining any gap below the door at a size that prevents items larger than a deck of cards from passing below the door.

FIG. 1 shows a first existing structure for attaching the bottom of a door to an air cargo container. A rigid, typically metal, rod 10 is attached to the bottom of a fabric door 12. At the ends of the rod 10, pins 14 or other latches attach the bar to the door frame 16 with keepers 18. The presence of a metal rod 10 along the full width of the fabric door 12 increases weight, and the keepers 18 that receive the pins 14 from the bar are susceptible to being damaged by forklifts and other handling equipment.

In another existing fastening structure, shown in FIG. 2, cleats 30 are attached to the bottom of the fabric door 12 and drop into corresponding entry points 32 (FIG. 9) in a track 34. The cleats 30 are intended to slide laterally along the track 34 (FIG. 9) to retain the fabric door 12. Applicant has found that the sliding action becomes difficult when foreign debris or corrosion affects the dimensions of the track 34 or the entry points 32.

FIG. 3 shows a third approach to securing the bottom of fabric doors 12 to the frame of an air cargo container. On wide doors, especially, fabric webbing straps 40 are sewn to the fabric door 12 with buckles 42 that attach to common double-stud fittings that clamp into holes in the track 34 provided in the base of an air cargo container. The straps 40 are inserted into the holes and buckles are tightened to hold the fabric door 12 securely down. This method reduces deflection, but can be time consuming, because there are often more than ten straps 40 and buckles 42 across the width of the fabric door 12. Further, in the regions between the straps 40, it may still be possible to insert cargo surreptitiously into the container between the bottom of the fabric door 12 and the track 34.

Therefore, there remains an opportunity to provide a more robust and user-friendly cargo container door lock to provide the security and thermal barrier benefits of bottom closures.

SUMMARY

The present disclosure includes a latch for securing a component to a track in a base of air cargo equipment, such as a pallet or the floor of a unit load device. The latch includes a rigid support configured to be attached at the bottom edge of the component. The latch also includes a handle. The handle rotates relative to the support between an open position and a closed position. The handle uses a rotationally tapered locking cam to secure the component to the track. In one embodiment, the component is a door, which may be a fabric curtain.

Another embodiment of the present disclosure includes a container, such as an air cargo container or "unit load device." The container may include a base having a track provided along at least a portion of at least one side of the base. The container may also include a plurality of walls, a door, and at least one latch attached at a bottom edge of the door. The base, the plurality of walls, and the door combine to enclose an interior volume for receiving cargo. The bottom edge of the door is configured to be at least partially received within the track. When the at least one latch is in a closed position, the bottom edge of the door is wedged within the track.

Another embodiment of the present disclosure includes a door for an air cargo container. The door may comprise at least one layer of fabric and at least one latching means for securing a bottom edge of the at least one layer of fabric to a track in a base of the air cargo container.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to the apparatus, product or component aspects or embodiments and vice versa.

As used in the description, the phrase "unit load devices (ULDs)" also known as "air cargo containers," is defined as containers used to load luggage, freight, mail, and the like on wide-body aircraft and some specific narrow-body aircraft. ULDs are particularly suited for the doors and latches described in the embodiments of the present disclosure, however, containers for other purposes are also within the scope of the present disclosure. As used in the description, unless otherwise specified, the term "door" may include rigid door constructions, such as an additional wall, semi-rigid constructions such as folded, segmented constructions, or flexible curtain type constructions.

Figure 4:
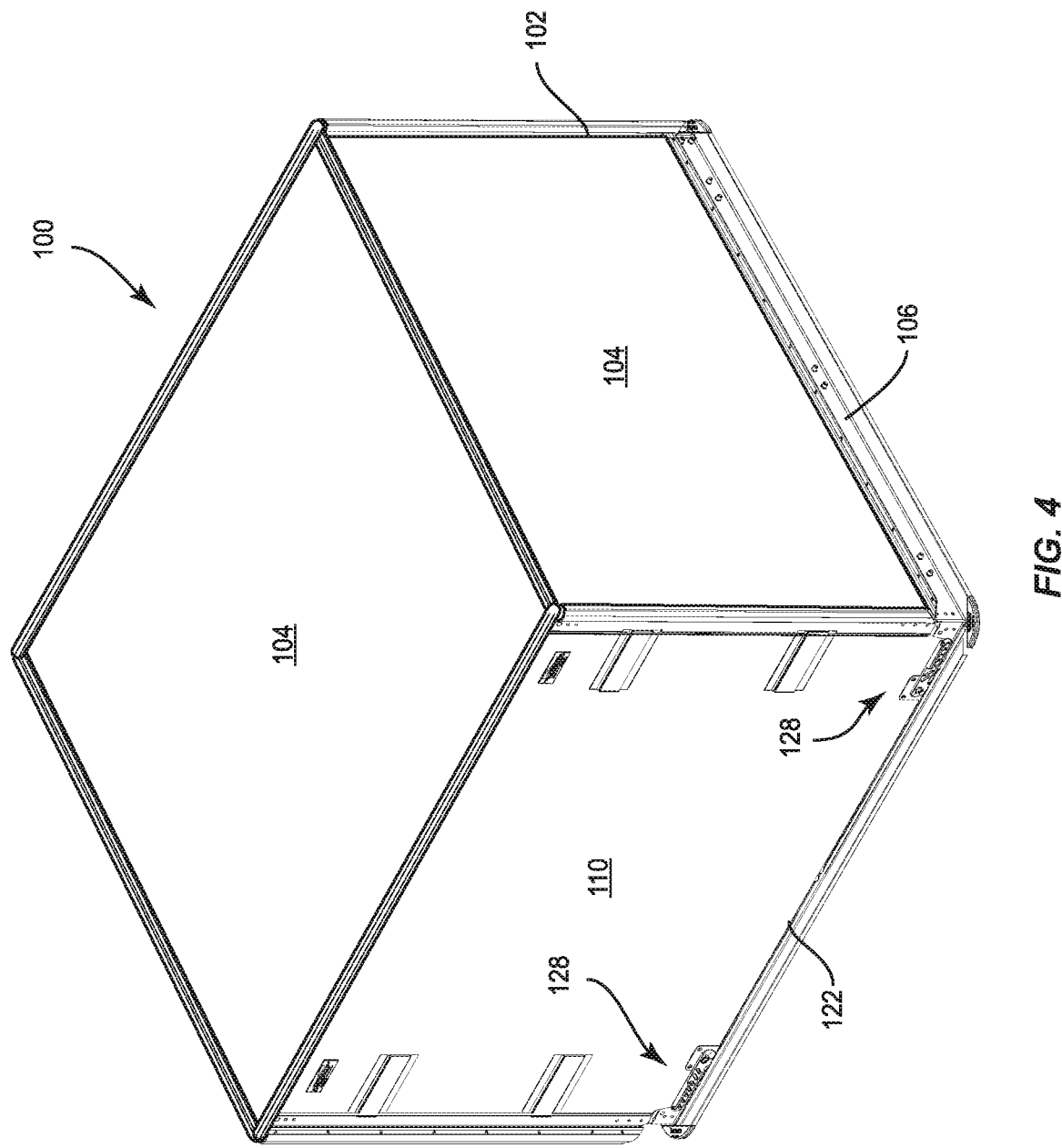
FIG. 4 is a perspective view of an air cargo container according to an embodiment of the present disclosure.

Referring now to FIG. 4, a container 100 is illustrated. The container 100 may include a frame 102 presenting a generally rectangular shape. The frame 102 may be formed from any substantially rigid material, such as aluminum, steel, composites, temperature resistant plastics, other metals and non-metals. The frame 102 may support a plurality of panels 104 forming the walls, including the roof, of the container 100 to define an interior volume for receiving cargo. The frame 102 may be applied to or formed as part of a base 106 that forms the floor of the container 100. In some embodiments, the base 106, also referred to as a pallet, may be employed without walls. Containers 100 and pallets may provide two types of air cargo equipment. In some embodiments, the panels 104 may be constructed together such that a separate frame may be eliminated. The panels 104 may be composite panels, preferred for their lightweight, thermal insulating, and high strength characteristics. Alternatively, the panels 104 may also include aluminum, aluminum/Lexan composite, webs, fabrics, or some other light weight material. In some instances an offset may be added to the shape of the container 100 to more closely follow the outline of the lower half of an aircraft. In other embodiments, the top of the container 100 may be curved or chamfered to more closely follow the outline of the upper half of an aircraft.

The cargo opening of the container 100 may be substantially sealed, and selectively closed, by a door 110. In one embodiment, the door 110 is a fabric door, also referred to as a curtain. The door 110 may be a conventional fabric sheet such as nylon, canvas, polyester, and other such materials. The fabrics are often coated with a water resistant or waterproof coating consisting of vinyl, polyethylene, neoprene, or other such materials. Alternatively, the door 110 may be constructed from high tenacity fabric made from at least 50% high tenacity fibers and preferably substantially 100% high tenacity fibers. As used herein, the term "high tenacity fibers" means fibers which have tenacities equal to or greater than about 7 g/d. Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d. Examples of high tenacity fibers include highly oriented high molecular weight polyolefin fibers, particularly high modulus polyethylene fibers, highly oriented high molecular weight polypropylene fibers, aramid fibers, polybenzoxazole fibers such as polybenzoxazole (PBO) and polybenzothiazole (PBT), polyvinyl alcohol fibers, polyacrylonitrile fibers, liquid crystal copolyester fibers, basalt or other mineral fibers, as well as rigid bar polymer fibers, and mixtures and blends thereof. Preferred fibers may include high tenacity ultra-high molecular weight polyethylene (UHWMPE) fibers such as SPECTRA®, aramid fibers sold under the trademarks Kevlar® or Nomex®, or liquid crystal fibers such as those sold under the trademark Vectran®.

Figure 6:
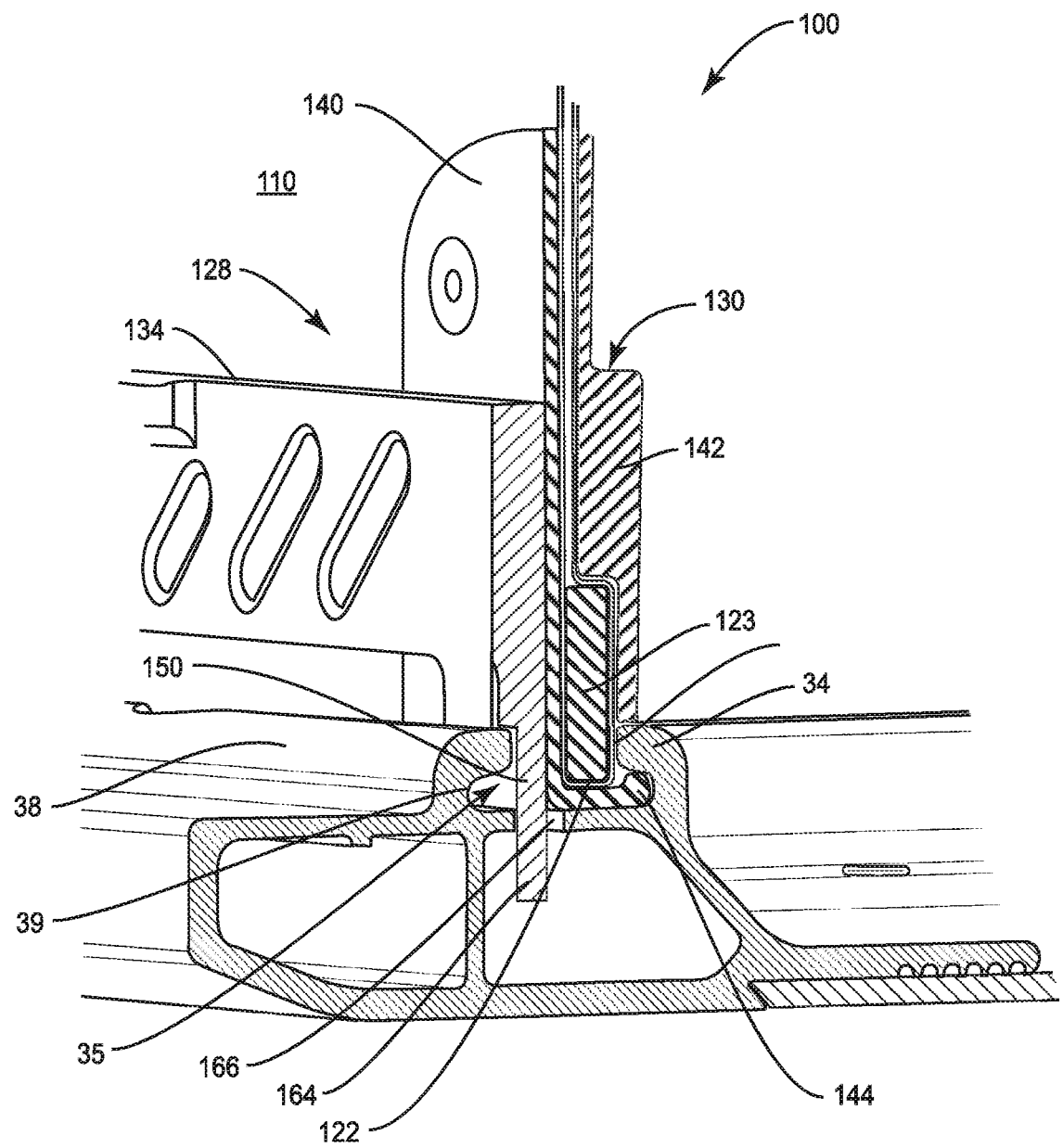
FIG. 6 is a cross section of the door with the latch in a closed position.
Figure 7:
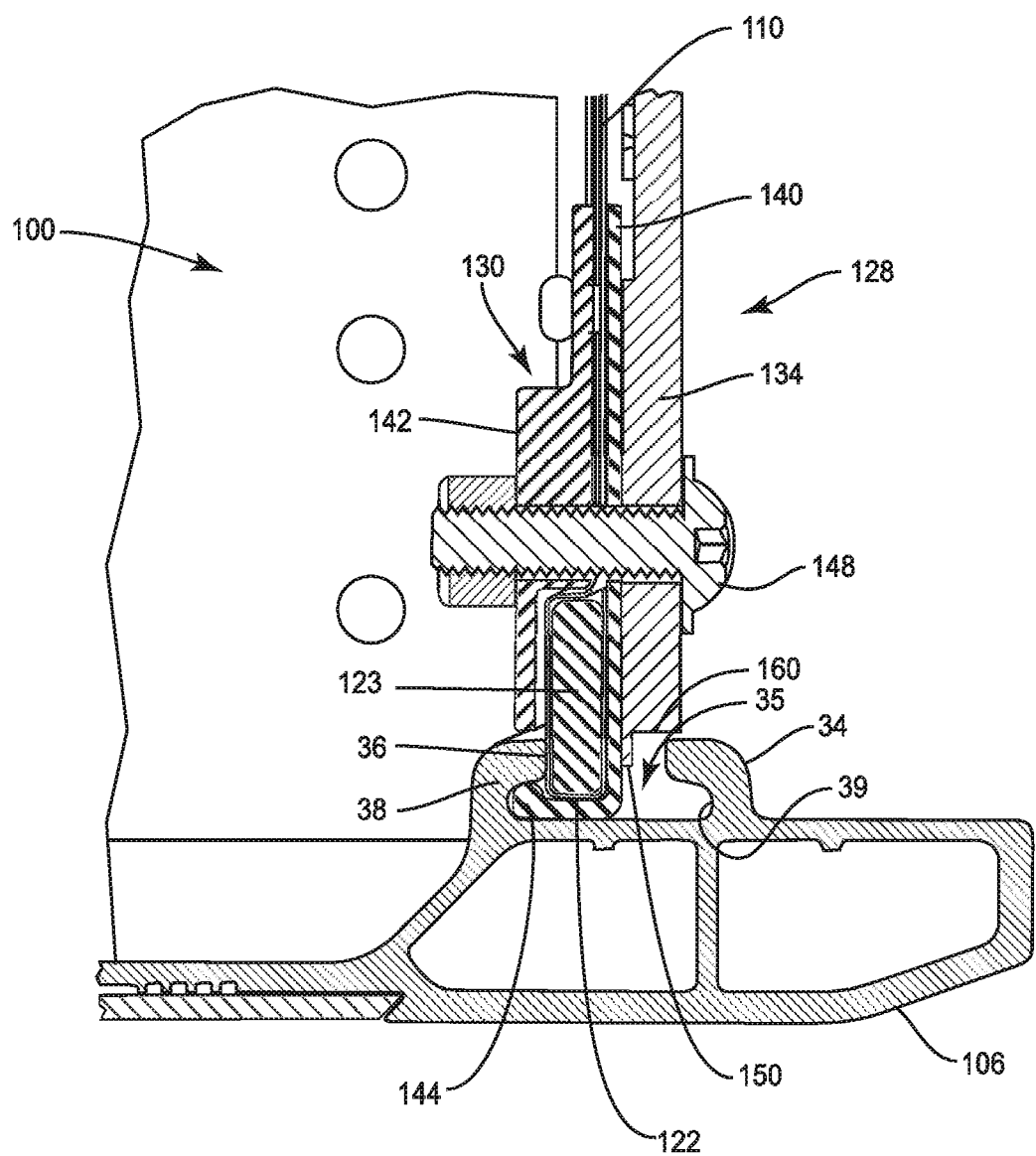
FIG. 7 is a cross section of the door with the latch in an open position and the door lowered into a track.

As shown in FIGS. 6 and 7, a hem at the bottom edge 122 of the door 110 between two plies of fabric may house a bar 123 extending at least partially along the bottom edge. The bar 123 may be made from a metallic or composite material to add stiffness to the bottom edge 122 of the door 110. A composite material, such as a carbon fiber reinforced resin, may be preferred due to its strength, stiffness, durability, and lightweight characteristics. Carbon fiber composite provides a stiffness of 10-40 Msi. In addition, the bar 123 is preferably resilient and difficult to permanently deform. In contrast, while a rod made from steel may have sufficient stiffness, steel may permanently deform if impacted with a forklift during transport of the container. A carbon fiber composite is much less likely to be permanently deformed. Preferably, the cross-section of the bar 123 is non-circular as discussed below.

Figure 2:
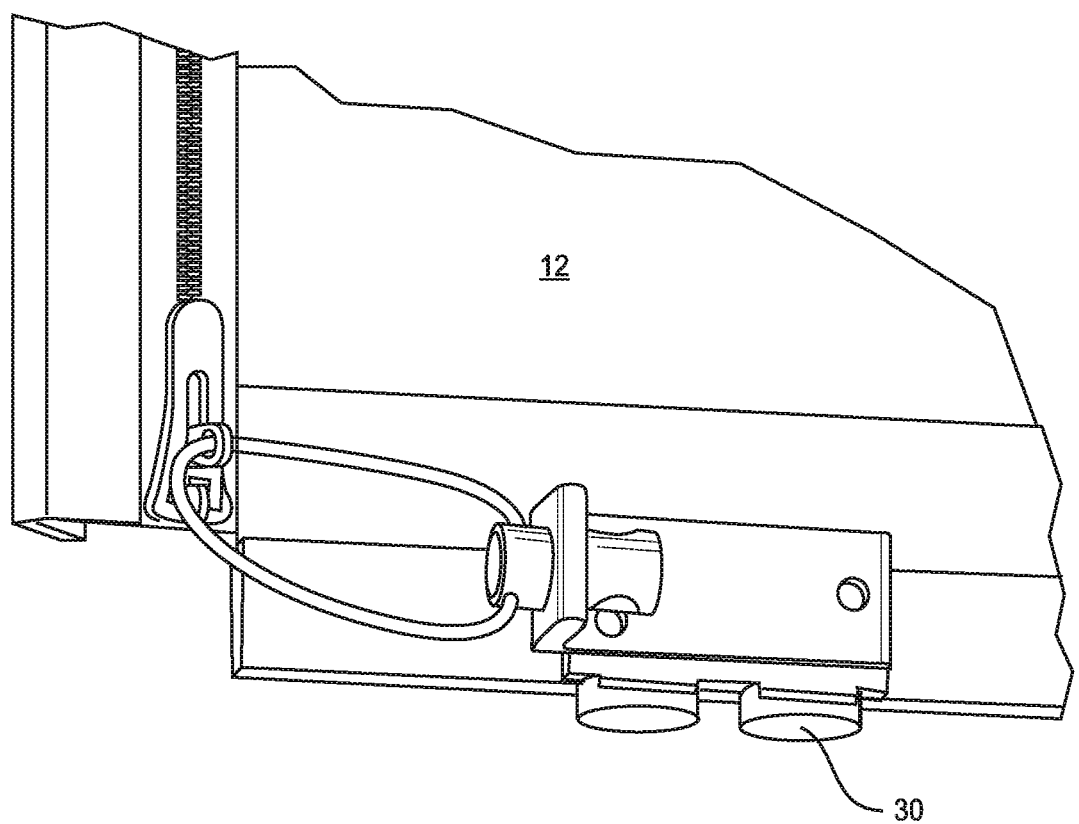
FIG. 2 shows a second conventional approach for securing the bottom of a door of an air cargo container.
Figure 3:
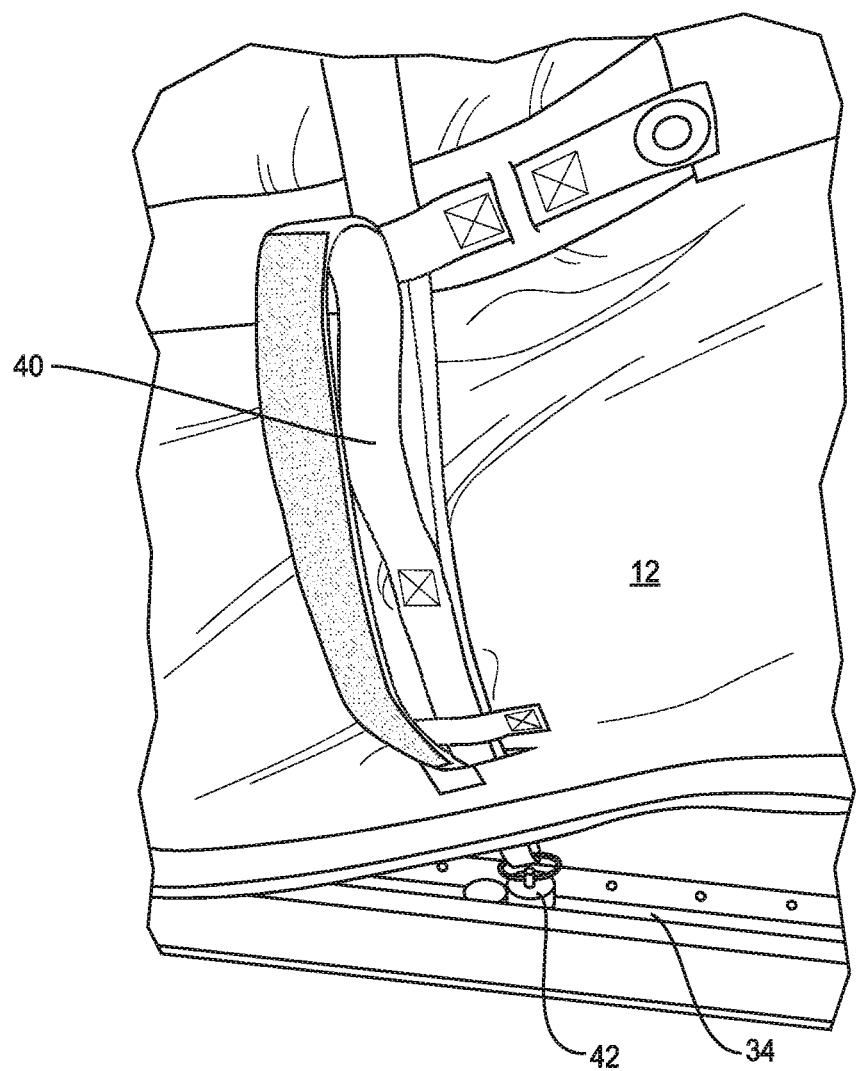
FIG. 3 shows a third conventional approach for securing the bottom of a door of an air cargo container.
Figure 5:
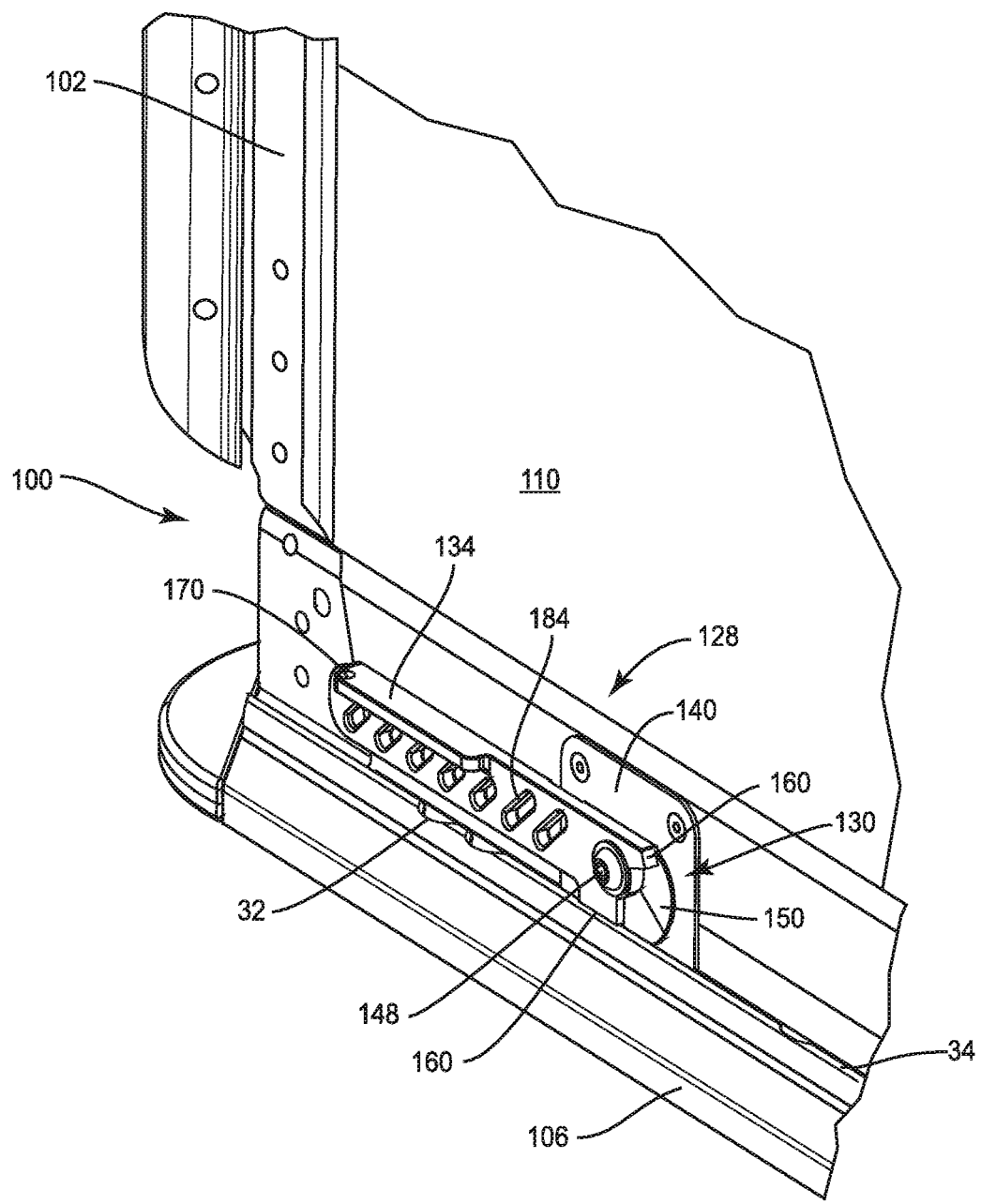
FIG. 5 is a detailed perspective view of a latch for securing a bottom edge of a door according to an embodiment of the present disclosure.

Returning to FIGS. 4 and 5, the door 110 may be substantially permanently attached along a top edge thereof to the frame 102. The door 110 may be attached to the frame 102 along the sides of the door using straps, zippers or other fasteners known in the art. Importantly for purposes of the present disclosure, the door 110 is fitted with at least one latch 128 to secure a bottom edge 122 of the door 110 relative to the base 106. In the illustrated embodiment, a latch 128 is provided proximate to each lower corner of the door 110. The latches 128 may be substantially identical. In the illustrated embodiment, the latches 128 are configured as mirror images of one another such that each latch has a handle that rotates open upward and toward a center of the door 110. FIG. 5 shows a detailed view of a latch 128 in a closed position, actively securing the bottom edge 122 of the door 110 in a closed position. As shown in FIG. 5 and others, the base 106 of the container 100 includes the track 34 provided along at least a portion of at least one side of the base. The track 34 may or may not include one or more round entry points 32 used by conventional cleats 30 (FIG. 2).

Figure 8:
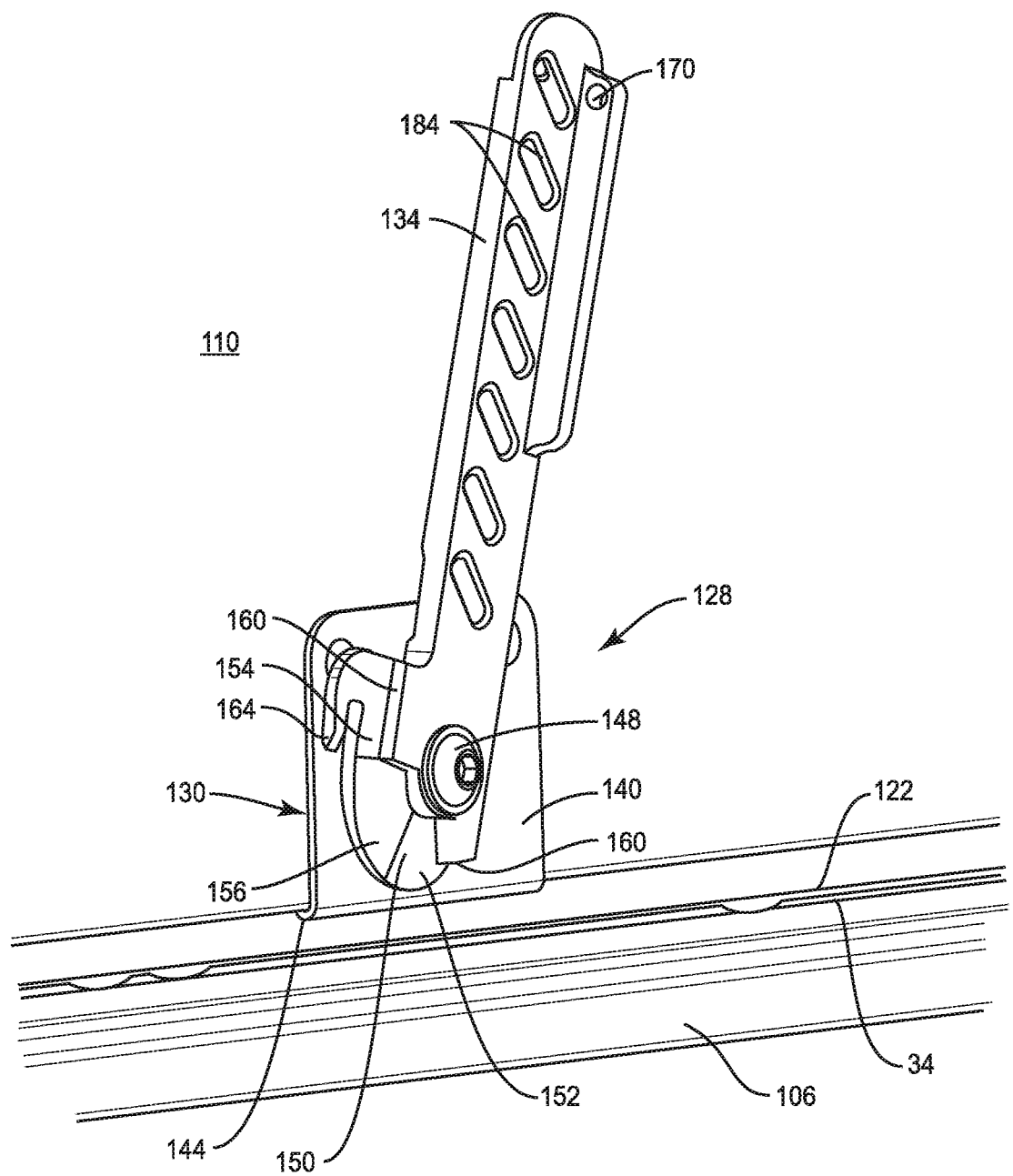
FIG. 8 is a perspective view of the door with the latch in an open position removed from the track.

With reference to FIGS. 6-8, the latch 128 may be attached at the bottom edge 122 of the door 110. The bottom edge 122 of the door 110 is configured to be at least partially received within the track 34 as shown in FIGS. 6 and 7. The track 34 may have the profile of a seat track with an inverted T-shaped channel 35 commonly used on the base 106 of air cargo containers and within aircraft. The T-shaped channel 35 may include an opening defined by opposing distal ends 36 of opposing L-shaped arms 38. The channel 37 may also include undercut regions 39 on either side of the opening.

Each latch 128 may include a support 130 configured to be attached at the bottom edge 122 of the door 110. The support 130 may be a rigid bracket secured to the door 110. The latch 128 may also include a handle 134. The handle 134 is designed to be capable of rotating relative to the support 130 between an open position (FIGS. 7 and 8) and a closed position (FIGS. 5 and 6). In the illustrated embodiment, the closed position of the handle 134 is approximately parallel with the bottom edge 122 of the door 110. As shown in FIG. 7, a fully open position of the handle 134 is approximately perpendicular to the bottom edge 122, and the sweep of the handle 134 may be approximately 100 degrees.

As possibly best shown in FIGS. 6 and 7, the support 130 may include a locking plate 140 and a backing plate 142. The locking plate 140 and the backing plate 142 may sandwich the door 110 and may be attached to the door, and one another, using rivets or similar fastening arrangements known in the art. In one embodiment, the locking plate 140 has a foot 144 that wraps under the door 110 and whose end is configured to fit within the undercut region 39 of the channel 35 of the track 34.

The handle 134 may rotate relative to the support 130 around a bolt 148 or similar pin used to attach the handle to the support. As possibly best shown in FIG. 8, the handle 134 may include locking cam 150 whose thickness is tapered as a function of the rotational sweep around the bolt 148. Thus, when the handle 134 is in the open position (FIGS. 7 and 8) the thinnest portion of the locking cam 150 is adjacent to the bottom edge 122 of the door 110, and when the handle is in the closed position (FIG. 6), the thickest portion of the locking cam is adjacent to the bottom edge of the door. Therefore, rotation of the handle 134 relative to the support 130 is configured to adjust the thickness of a portion of the tapered locking cam 150 between the bottom edge 122 of the door 110 and a distal end 36 of one of the opposing L-shaped arms 38 of the track 34 when the bottom edge of the door is received in the channel 35. The locking cam 150 may be substantially continuously tapered. As shown in FIG. 8, the locking cam 150 may alternatively include in thin region 152 of substantially constant thickness, a thick region 154 of substantially constant thickness, and a tapered region 156 in between.

The handle 134 may also be designed with one or more stop surfaces 160 adjacent to the locking cam 150. The stop surfaces 160 are configured to abut an upper surface of the arms 38 of the track 34 to limit rotation of the handle 134 when the bottom edge 122 of the door 110 is at least partially received in the channel 35.

Figure 9:
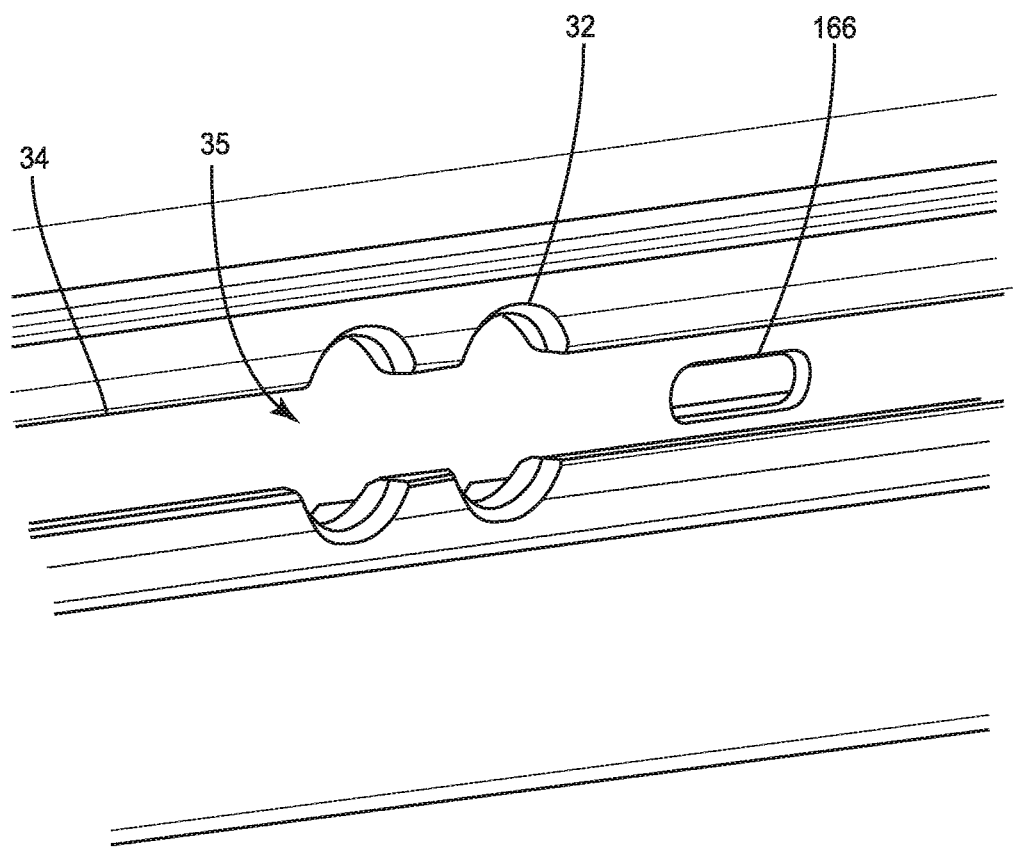
FIG. 9 is a perspective view of the track of an air cargo container according to an embodiment of the present disclosure.

In the illustrated embodiment, as possibly best seen in FIG. 8, the handle 134 has a hook 164. Rotating the handle 134 to the closed position is configured to engage the hook 164 with a keeper slot 166 (FIG. 9) within the track 34 at the bottom of the channel 35. The hook 164 is optional. When the hook 164 and slot 166 are provided, the track 34 may include markings or indicia (not shown) to help the operator properly position the latch 128 along the track 34 prior to closing the handle 134.

In a preferred embodiment, the latch 128 is designed such that the lower edge 122 of the door 110 is retained within the channel 35, for example by engagement between the foot 144 of the locking plate 142 and the undercut region 39 of the channel. Therefore, the interaction between the hook 164 and the keeper slot 166 is intended to be redundant in some embodiments. Closures for air cargo containers relying exclusively upon a hook have been unsuccessfully tried in the past. To carry the load, large hooks were necessary. If cargo shifted against the prior art hook, it was very difficult to disengage the latch.

Figure 1:
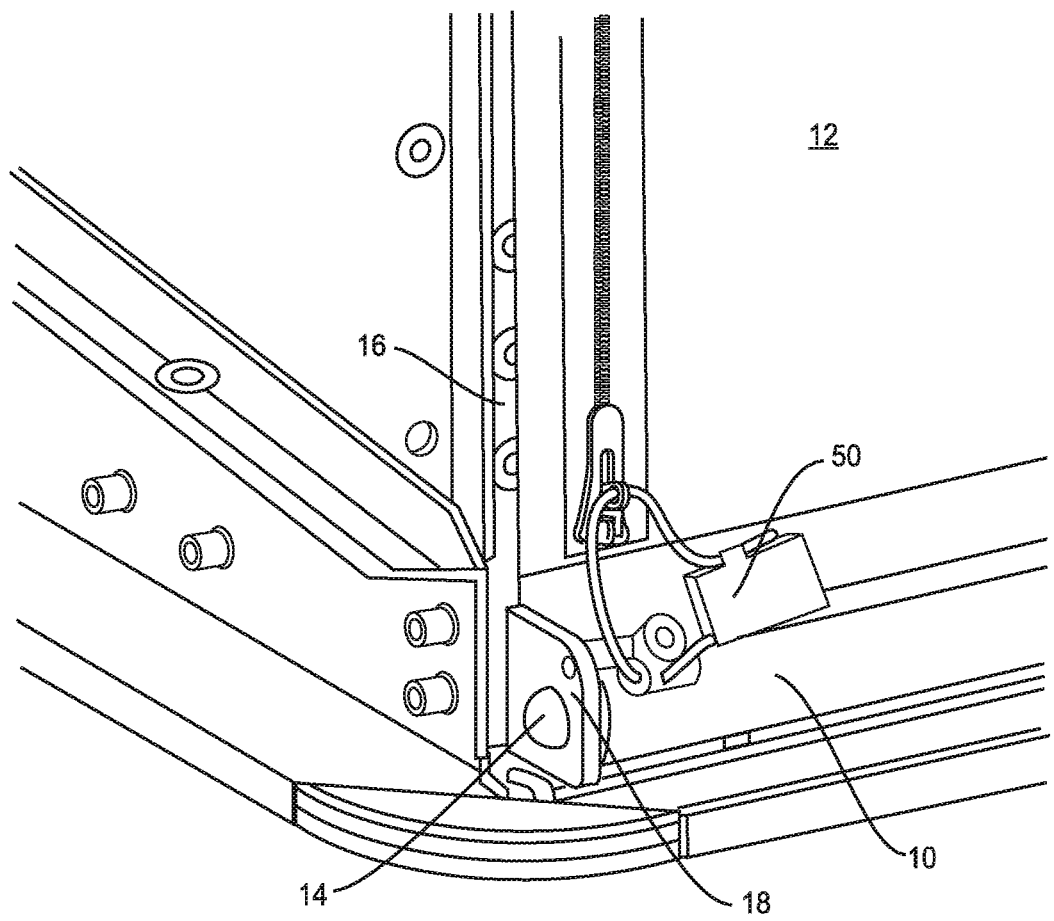
FIG. 1 shows a first conventional approach for securing the bottom of a door of an air cargo container.

Returning to FIG. 5, the handle 134 may include an aperture 170 proximate to a distal end of the handle that is opposite the pivot point thereof (i.e. opposite the locking cam 150). The aperture 170 is intended to receive a security tag (50, FIG. 1), which are often added to air cargo containers after the container has been filled, and the cargo opening has been sealed, in an attempt to create evidence of tampering. Typically, security tags 50 fix side closures to bottom closures at the lower corners of a door 12, 110. Therefore, configuring the handles 134 of the two latches 128 shown in FIG. 4 to rotate upward and toward the center of the door 110 may be advantageous for receiving security tags 50.

Arranging the handles 134 to rotate closed toward the side edges of the door 110, and locating the latches 128 as close to the corners of the door 110 may also be advantageous because the distal end of the handles 134 could overlap a structural gusset of the frame 102 of the container 100. This gusset can help prevent internal loads from shifting against an inside of the handle 134 or pressing out on the door 110 such that the internal load overhangs the handle. Without this internal protection, it is conceivable that the handle 134 would be hard to rotate if a load was heavily pushed against it or positioned directly above the handle. The internal gusset can also help to prevent the handle 134 from being forced toward the inside of the container 100 in the event of an external hit from a forklift or other obstacle.

Having described the structure of the door 110, the at least one latch 128 attached thereto, and the base 106 with a track 34 according to several embodiments above, the use of the latch 128 to secure the bottom edge 122 of the door 110 to the track 34 will be described further below, but should also be apparent to one of ordinary skill in the art.

With reference to FIG. 7, the bottom edge 122 of the door 110 is designed to be inserted through the opening in the channel 35 of the track 34 when the handle 134 is in the open position. Particularly, the distance between the opposed distal ends 36 of the legs 38 is intended to be wider than the length of the foot 144, and wider than the combined thickness of the bar 123, locking plate 140 of the support 130, and the thinnest portion of the locking cam 150.

To secure the bottom edge 122 of the door 110 within the channel, the handle 134 is rotated toward the closed position thereof. As the handle 134 is rotated, the tapered thickness of the locking cam 150 is wedged between the locking plate 140 of the support 130 and the distal end 36 of one of the legs 38 of the track 34. As the locking cam 150 is wedged in place, the bottom edge 122 of the door 110 is forced inward relative to the container 100 (to the right in FIG. 6), forcing the foot 144 into the undercut region 39. The abutment between the locking cam 150 and the leg 38 prevents outward movement that may seek to dislodge the door 110 from the track 34. The placement of the foot 144 within the undercut region 39 of the channel 35 prevents upward movement that may seek to dislodge the bottom edge 122 of the door 110 from the track 34. In one embodiment, the foot 144 and the locking plate 140 span at least three inches along the bottom edge 122 to distribute any load thereon and accommodate higher loads without being damaged. The locking cam 150 also functions to spread loading forces out over a much longer area than straps, and also provides a high mechanical advantage arm to disengage the cam when attempting to unlock the door 110 after the cargo may have shifted inside the container 100.

In one embodiment, a broad interior surface of the bar 123 is configured to distribute the force from the locking cam 150 into a contact force between the interior of the door 110 at the bottom edge 122 thereof and the distal end 36 of the interior one of the legs 38 that defines the channel 35. This engagement is designed to form a substantially weather-resistant seal and limit or eliminate convection of air under the door 110, thus improving the thermal management properties of the container 100. A weather-resistant seal may be determined based upon the ULD Regulations published by the International Air Transport Association (IATA).

When used on air cargo containers, the weight of the latches 128 is important because every kilogram of extra weight on an aircraft can cost $100 or more per year in fuel burn. The latches 128 of the embodiments discussed above are preferably less than 1 Kg each even though the support 130 and the handle 134 are formed from strong metals such as aluminum or steel. To further reduce weight, apertures 184 may be provided through the body of the handle 134.

To summarize, the latches 128 of the present disclosure are simple to operate, are designed to meet SAE AS36100 (2016), operate in all weather conditions, and are designed to minimize the likelihood of being damaged during use, such as by a forklift. The latches 128 also contribute to forming a weather-resistant seal and thermal barrier with the base 106 of the container 100. The latches 128 are designed to be lightweight, which may include a high-strength aluminum construction of the handle 134 and support 130. The latches 128 may cooperate with a conventional seat track design or require only minimal modification to the seat track to include a keeper slot 166, if the latch has an optional secondary safety factor using a hook 164.

In the illustrated embodiment, the latches 128 are shown attached to a door 110 to secure the bottom edge 122 of the door to the track 34 of the base 106. Because of their lightweight construction and ease of use, the latches 128 may also be useful for securing other components into the track 34 of the base 106. For example, it is conceivable that the latches 128 may be attached at a bottom edge of the panels 104 to removably secure the walls of a container 100 to the base 106. For example, a bottom edge of the panels 104 may taper such that the bottom edge is capable of fitting within the opening to the track 34. In other embodiments, an enclosed container 100 may not be preferred. Instead, the base 106 may be used as a pallet, and latches 128 according to the present disclosure may be used to attach posts incrementally or selectively around the pallet when a track 34 is provided on all sides of the pallet. The posts may be wrapped with netting or other straps to retain a load. Use of selectively placed posts around the base 106 may allow for retaining an oddly shaped or oversized load that could extend beyond the footprint of the base.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A latch for securing a component to a track in a base of air cargo equipment, the latch comprising:
   a rigid support configured to be attached at a bottom edge of the component; and
   a handle, the handle configured to rotate relative to the support between an open position and a closed position, wherein the handle comprises a rotationally tapered locking cam, and
   wherein the support comprising a locking plate configured to wrap under the component, the locking plate having a foot configured to fit within an undercut region of the track provided in the base.

2. The latch of claim 1, wherein rotation of the handle relative to the support is configured to adjust the thickness of a portion of the tapered locking cam between the bottom edge of the component and the track when the bottom edge of the component is received in the track.

3. The latch of claim 2, wherein the handle comprises at least one stop surface adjacent to the tapered locking cam, wherein the at least one stop surface is configured to abut an upper surface of the track to limit rotation of the handle when the bottom edge of the component is at least partially received in the track.

4. The latch of claim 1, wherein the handle comprises a hook, and rotating the handle to the closed position is configured to engage the hook with a keeper slot within the track.

5. A door for an air cargo container, comprising:
   at least one layer of fabric constructed from high tenacity fibers; and
   a latch attached at a bottom edge of the at least one layer of fabric for securing the at least one layer of fabric to a track in a base of the air cargo container, the latch comprising:
      a rigid support attached at the bottom edge of the at least one layer of fabric; and
      a handle, the handle configured to rotate relative to the support between an open position and a closed position, the handle including a rotationally tapered locking cam.

6. The door of claim 5, further comprising a bar extending at least partially along the bottom edge, the bar made from a composite material to add stiffness to the bottom edge of the at least one layer of fabric.

7. A container, comprising:
   a base, the base comprising a track provided along at least a portion of at least one side of the base;
   a plurality of walls;
   a door; and
   at least one latch attached at a bottom edge of the door,
   wherein the base, the plurality of walls, and the door combine to enclose an interior volume for receiving cargo,
   wherein the bottom edge of the door is configured to be at least partially received within the track,
   wherein, when the at least one latch is in a closed position, the bottom edge of the door is wedged within the track, and
   wherein the bottom edge of the door includes a bar extending at least partially therealong, the bar configured to add stiffness to the bottom edge of the door.

8. A container, comprising:
   a base, the base comprising a track provided along at least a portion of at least one side of the base;
   a plurality of walls;
   a door; and
   at least one latch attached at a bottom edge of the door,
   wherein the base, the plurality of walls, and the door combine to enclose an interior volume for receiving cargo,
   wherein the bottom edge of the door is configured to be at least partially received within the track,
   wherein, when the at least one latch is in a closed position, the bottom edge of the door is wedged within the track, and
   wherein the track has a T-shaped channel and the at least one latch wedges the bottom edge of the door into contact with an arm that defines the channel to form a substantially weather-resistant seal.

9. The container of claim 7, wherein the bar is made from a composite material.

10. The container of claim 9, wherein the cross-section of the bar is non-circular.

11. The container of claim 7, wherein the at least one latch comprises a support and a handle, wherein the handle comprises a rotationally tapered locking cam, and the handle is configured to rotate relative to the support.

12. The container of claim 11, wherein the support comprises a locking plate, the locking plate includes a foot configured to wrap under the door and fit within an undercut region of the track.

13. The container of claim 11, wherein rotation of the handle relative to support changes the thickness of a portion of the tapered locking cam between the bottom edge of the door and the track when the bottom edge of the door is received in the track.

14. The container of claim 13, wherein the handle comprises at least one stop surface adjacent to the tapered locking cam, wherein the at least one stop surface is configured to abut an upper surface of the track to limit rotation of the handle when the bottom edge of the door is at least partially received in the track.

15. The container of claim 11, wherein the handle comprises a hook, and rotating the handle to a closed position is configured to engage the hook with a keeper slot within the track.

16. The container of claim 7, wherein the door comprises one or more layers of fabric comprising high tenacity fibers.

17. A door for an air cargo container, comprising:
at least one layer of fabric; and
at least one latching means attached at a bottom edge of the at least one layer of fabric for securing the bottom edge of the at least one layer of fabric to a track in a base of the air cargo container.

18. The door of claim 17, wherein the at least one latching means includes a handle configured to rotate between an open position and a closed position, the handle including a rotationally tapered locking cam.

* * * * *